United States Patent
Akgun et al.

(10) Patent No.: US 8,077,987 B2
(45) Date of Patent: Dec. 13, 2011

(54) METHODS AND APPARATUS FOR PROCESSING OF A DIGITAL IMAGE

(75) Inventors: Toygar Akgun, Atlanta, GA (US); Baris Uyar, Istanbul (TR); Yucel Altunbasak, Alpharetta, GA (US)

(73) Assignee: Vestel Elektronik Sanayi Ve Ticaret A.S., Manisa (TR)

( * ) Notice: Subject to any disclaimer, the term of this patent is extended or adjusted under 35 U.S.C. 154(b) by 967 days.

(21) Appl. No.: 12/034,510

(22) Filed: Feb. 20, 2008

(65) Prior Publication Data

US 2008/0205784 A1     Aug. 28, 2008

Related U.S. Application Data

(60) Provisional application No. 60/891,604, filed on Feb. 26, 2007.

(51) Int. Cl.
   G06K 9/36    (2006.01)
   G06K 9/40    (2006.01)
   H04N 7/12    (2006.01)
   H04N 11/02   (2006.01)

(52) U.S. Cl. .......... 382/232; 382/266; 348/420.1; 375/426.1

(58) Field of Classification Search .......... 382/254, 382/232–233, 250, 266, 298, 300; 348/398.1, 348/420.1, 426.1; 375/240.24; 345/603, 345/606
See application file for complete search history.

(56) References Cited

U.S. PATENT DOCUMENTS

| | | | | |
|---|---|---|---|---|
| 5,274,449 A | * | 12/1993 | Keesen | 348/469 |
| 5,703,965 A | * | 12/1997 | Fu et al. | 382/232 |
| 6,088,489 A | * | 7/2000 | Miyake | 382/299 |
| 6,477,279 B2 | * | 11/2002 | Go | 382/240 |
| 6,614,484 B1 | | 9/2003 | Lim | |
| 6,898,319 B1 | | 5/2005 | Hazra | |

FOREIGN PATENT DOCUMENTS

EP    1213928 A2    12/2002

OTHER PUBLICATIONS

Allebach, Jan et al. "Edge-Directed Interpolation", International Conference on Image Processing, 1996 Proceedings, vol. 3, pp. 707-710.
Wang, Qing et al. "A New Edge-Directed Image Expansion Scheme", 2001 International Conference on Image Processing, 2001 Proceedings, vol. 3, pp. 899-902.
Shi, Hongjian et al. "Canny Edge Based Image Expansion", IEEE International Symposium on Circuits and Systems, 2002, vol. 1, pp. I-785-I-788.
Zhao, Meng et al. "Towards an Overview of Spatial Up-conversion Techniques", Proceedings of ISCE, Sep. 24, 2002, pp. 23-28.
European Search Report for Application No. 07251410.2-1522, dated Jan. 22, 2008, 4 pages.

* cited by examiner

*Primary Examiner* — Kanjibhai Patel
(74) *Attorney, Agent, or Firm* — Conley Rose, P.C.

(57) ABSTRACT

Edge information of an input digital image is obtained. Digital image data corresponding to the input digital image is transmitted to a receiver. The edge information is also transmitted to the receiver. An output digital image is obtained at the receiver by processing the digital image data received at the receiver using the edge information received at the receiver. In this way, because the edge information is transmitted separately, as side information, and does not have to be obtained at the receiver, the computational complexity requires of the receiver is low. This enables for example real-time edge-adaptive interpolation to be carried out at the receiver.

28 Claims, 1 Drawing Sheet

TRANSMITTER SIDE                    RECEIVER SIDE

METHODS AND APPARATUS FOR PROCESSING OF A DIGITAL IMAGE

CROSS-REFERENCE TO RELATED APPLICATIONS

This application claims the benefit of priority to U.S. application Ser. No. 60/891,604 filed Feb. 26, 2007, the content of which is hereby incorporated by reference in its entirety for all purposes.

FIELD OF INVENTION

The invention relates to methods and apparatus for processing of a digital image.

BACKGROUND

A number of techniques are known for processing of digital images in which edge information is used to improve the quality of the output image. For example, low resolution images may be interpolated to produce high resolution images, with the interpolation being edge-adaptive so that the quality of the output image, particularly around edges in the image, is improved by removing or reducing blockiness, blurring and zigzag edges which can occur with non-edge based techniques.

A number of edge-adaptive interpolation methods are known and reference may be made for example to "Edge-Directed Interpolation" by Jan Allebach and Ping Wah Wong, International Conference on Image Processing, 1996 Proceedings, Volume 3, pages 707-710; "A New Edge-Directed Image Expansion Scheme" by Qing Wang and Rabab Ward, 2001 International Conference on Image Processing, 2001 Proceedings, Volume 3, pages 899-902; and "Canny Edge Based Image Expansion" by Hongjian Shi and Rabab Ward, IEEE International Symposium on Circuits and Systems, 2002, Volume 1, pages I-785-I-788. In general, edge information is used to locally adapt filter coefficients that are used during the interpolation of the input image data. Edge-adaptive interpolation methods generally have a high computational complexity owing to the additional edge processing. Robust edge detectors require spatial filtering with multiple filters corresponding to different edge orientations, resulting in a high computational burden.

An approach to edge-adaptive interpolation is to use edge information, which may be in the form of an explicit edge map that contains information about edges in the image, to guide the interpolation process. This is shown schematically in FIG. 1.

First, a sub-pixel edge estimator 1 obtains an accurate estimate of the high resolution edge map. This edge map of the interpolated (output) image can be obtained in two distinct ways. In one, a simple interpolation technique (such as bilinear or bicubic interpolation) can be used to obtain an initial interpolated (higher resolution) image, and then the estimated edge map is obtained from this initial interpolated image using edge detection masks. Alternatively, an edge map can first be obtained from the original input image and then this edge map is interpolated to obtain the edge map of the output image.

Secondly, the initially obtained edge map is processed 2. It is a fact that regardless of the way that the edge map is initially obtained, it is in general only an approximation and some form of post-processing is required to refine the edge map. This usually is carried out to ensure connectedness so that isolated false edge locations are eliminated.

Lastly, the edge-directed interpolation 3 of the input image is carried out using the final edge map to provide the output image. In general, because the edge detection phase is computationally intensive, a simple interpolation technique may be preferred. One way to achieve this is to slightly modify bilinear interpolation to make it edge-adaptive. In this technique, the output pixel is computed as a weighted linear combination of its closest four neighbours where the weights are chosen to account for the local edge structure.

Whilst this example obtains a high resolution edge map, a low resolution edge map may be obtained and used in the interpolation instead, though with some loss of quality in the output image. A low resolution edge map may be obtained directly from the low resolution input image.

In this process, the accuracy of the edge information is probably the single most important factor in determining the overall performance of a typical edge-directed interpolation scheme. Now, in the context of video streaming and video transmission applications, such as digital television broadcasting or video-on-demand, it is a fact that receivers (such as television receivers, TV broadcast capture cards for personal computers, etc.) are designed to be as simple as possible to reduce cost and in order to be robust. These simple receivers have low computational power and are highly optimised for a small set of predetermined processing tasks (such as MPEG decoding and some mild post-processing). Accordingly, at least with current technology and at a low or medium cost, performing accurate edge detection on the receiver side is not an option. The alternative of using a simple edge-detection method, requiring low computational complexity, to obtain low accuracy edge information results in visual artefacts (such as noisy and blurred edges, ringing and the like). If noise filtering is used prior to the edge-directed interpolation when low accuracy edge information is used, the computational load increases again, which again rules out this possibility in practice. (Of course, for high end products, for which the higher component cost is acceptable to the consumer, edge detection and processing can be carried out at the receiver by using more powerful processors.)

According to a first aspect of the invention, there is provided a method of processing of a digital image, the method comprising:

obtaining edge information of an input digital image;

transmitting digital image data corresponding to the input digital image to a receiver;

transmitting the edge information to the receiver; and, obtaining an output digital image at the receiver by processing the digital image data received at the receiver using the edge information received at the receiver.

By using edge information at the receiver where the edge information is provided to the receiver and does not have to be obtained at the receiver, the computational complexity required of the receiver is low. This means that edge-adaptive processing of the digital image data can be carried out at the receiver in real time using a relatively low cost processor at the receiver. This means that real-time edge-adaptive scaling of video signals can be carried out at the receiver to achieve high quality images. As well as being used for scaling of low resolution to higher resolution images, the invention can be used in other processing techniques at the receiver, including for example spatially-adaptive down-sampling of a high resolution image to a lower resolution (for example, to down-sample a high definition television image to a standard definition television image), conversion from one image standard to another, etc.

The image may be a still image but in general will be a video image, i.e. one image of many in a video stream. The image may be a frame of a video stream and, indeed, the process may be applied to all frames of a video stream.

The method may comprise encoding input digital image data corresponding to the input digital image prior to transmission; wherein the digital image data that is transmitted is the encoded input digital image data; and, wherein the processing of the digital image data received at the receiver comprises decoding the encoded input digital image data received at the receiver. The encoding may comprise compressing the input digital image data and the decoding comprises decompressing the compressed input digital image data. In general, compression of an input image, such as is used in may digital image transmission protocols, leads to compression artefacts, such as blocking and ringing. Such artefacts are usually of a high frequency nature and are recognised as edges by sub-pixel edge detection algorithms. By performing the edge detection at for example the transmitter before the video stream is compressed and sending the edge information separately, this problem is avoided. Some compression standards, such as MPEG, use anchor frames or so-called I-frames, and the method may be applied to such I-frames only.

In an embodiment, the encoding comprises encoding the input digital image data as blocks of pixels, and the obtaining of the edge information comprises obtaining respective edge information for at least some of the blocks, and the processing of the digital image data received at the receiver comprises processing the pixels in said blocks respectively according to the edge information of each of said blocks.

The processing of the digital image data received at the receiver may comprise scaling the input digital image so that the resolution of the output digital image is different from the resolution of the input digital image.

The scaling may comprise interpolating the input digital image so that the resolution of the output digital image is higher than the resolution of the input digital image, the interpolating being edge-adaptive and using the edge information received at the receiver. In general, any edge-adaptive interpolation method may be used.

The scaling may comprise down-sampling the input digital image so that the resolution of the output digital image is lower than the resolution of the input digital image, the down-sampling being edge-adaptive and using the edge information received at the receiver. Again, in general, any edge-adaptive down-sampling method may be used.

The processing may comprise converting the digital image data received at the receiver from one standard format to another standard format using the edge information received at the receiver. For example, the digital image data may be converted from 720 progressive scan format to 1080 progressive scan format, or from standard definition to high definition, etc., etc.

According to a second aspect of the invention, there is provided a system for processing of a digital image, the system comprising:

a transmitter-side apparatus and a receiver-side apparatus;

the transmitter-side apparatus being constructed and arranged to obtain edge information of an input digital image, to transmit digital image data corresponding to the input digital image to the receiver-side apparatus, and to transmit the edge information to the receiver-side apparatus; and, the receiver-side apparatus being constructed and arranged to obtain an output digital image at the receiver-side apparatus by processing the digital image data received at the receiver-side apparatus using the edge information received at the receiver-side apparatus.

The computational burden of obtaining the edge information is placed at the transmitter-side apparatus, where, in general, high computing power is already available, whereas the computational requirements on the receiver-side can be kept low.

According to a third aspect of the invention, there is provided a method of processing of a digital image, the method comprising:

obtaining edge information of an input digital image;

transmitting digital image data corresponding to the input digital image to a receiver; and, transmitting the edge information to the receiver; and whereby an output digital image can be obtained at the receiver by processing the digital image data received at the receiver using the edge information received at the receiver.

According to a fourth aspect of the invention, there is provided transmitter-side apparatus for processing of a digital image, the apparatus being constructed and arranged to obtain edge information of an input digital image, to transmit digital image data corresponding to the input digital image to a receiver, and to transmit the edge information to the receiver:

whereby an output digital image can be obtained at the receiver by processing the digital image data received at the receiver using the edge information received at the receiver.

According to a fifth aspect of the invention, there is provided a method of processing of a digital image, the method comprising:

receiving at a receiver edge information of an input digital image;

receiving at the receiver digital image data corresponding to the input digital image; and, obtaining an output digital image at the receiver by processing the digital image data received at the receiver using the edge information received at the receiver.

According to a sixth aspect of the invention, there is provided receiver-side apparatus for processing of a digital image, the apparatus being constructed and arranged to receive transmitted edge information of an input digital image, to receive transmitted digital image data corresponding to the input digital image, and to obtain an output digital image by processing the received digital image data using the edge information.

The methods described herein may be carried out by appropriate software running on appropriate computer equipment. The software may be embedded in an integrated circuit, the integrated circuit being adapted for performing, or for use in the performance of, the relevant processes. Many of the processing steps may be carried out using software, dedicated hardware (such as ASICs), or a combination.

BRIEF DESCRIPTION OF THE DRAWINGS

Embodiments of the invention will now be described by way of example with reference to the accompanying drawings, in which.

Figure 1:
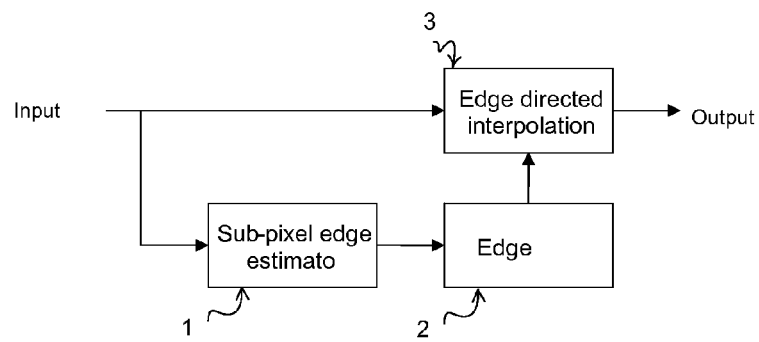
FIG. 1 shows schematically a prior art technique for edge-adaptive interpolation; and, FIG. 2 shows schematically an example of an embodiment of the invention.
Figure 2:
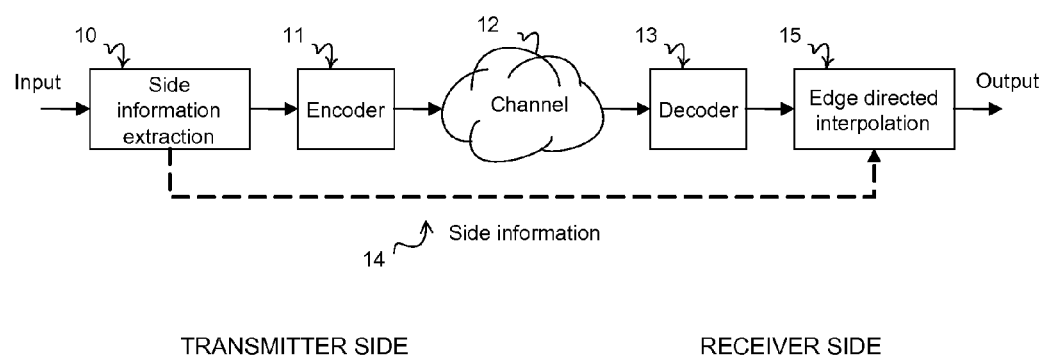
Referring to FIG. 2, in an example of one embodiment of the invention, edge information is extracted from an image. The edge information is conveniently and preferably in the form of a high accuracy sub-pixel edge map that is extracted by an extraction block 10 on the transmitter-side. The edge map may be of for example all frames of an input video image stream, or only selected frames (such as the I-frames) of an input video image stream. This extraction is carried out on a frame-by-frame basis, i.e. a separate edge map is obtained for each frame under consideration.

In general, the edge maps may be obtained by any suitable method. For example, as described above, to obtain a high resolution edge map, which is preferred in order to obtain the best quality output image, a simple interpolation technique (such as bilinear or bicubic interpolation) can be used to obtain an initial interpolated image and then the estimated edge map is obtained from this initial interpolated image using edge detection masks. Alternatively, an edge map can first be obtained from the original input image and then this edge map is interpolated to obtain the edge map of the output image. Either way, the initially obtained edge map is preferably processed to refine the edge map, again as described briefly above. Whilst it is preferred to use a high resolution edge map, a low resolution edge map may be obtained and used in the interpolation instead, though with some loss of quality in the output image. A low resolution edge map may be obtained directly from the low resolution input image.

It should be noted that in the edge map extraction 10, the selection of pixels may depend on the quality requirements and the specific edge-adaptive interpolation method that is ultimately used (as discussed below).

Next, in this embodiment, an encoder 11 encodes the input video signal. This may be in accordance with one of the known video coding standards, such as H.263/4 or MPEG-1/2/4. Optionally, the encoder 11 may compress the data at the same time.

The encoded video signal is then transmitted over some channel 12. As will be well understood, the channel 12 could be one of many types or a combination, including wired or wireless, broadcast or narrowcast, over the Internet, etc. In any event, a decoder 13 on the receiver-side receives the transmitted encoded video signal, decompresses it if necessary and decodes the received signal as appropriate.

In addition to the encoded video signal being transmitted to the receiver-side, the corresponding edge information, which in this example is in the form of edge maps, is also transmitted as side information 14, preferably simultaneously with the corresponding frames of the video image signals. This side information 14 is received at the receiver-side.

The received side information 14 is used to provide edge information which is used in an edge-adaptive interpolation block 15 to aid interpolation of the decoded video signal received from the decoder 13. In general, the interpolation method used in the interpolation block 15 may be of any suitable type. Nevertheless, in order to keep down costs at the receiver-side (which will often be consumer equipment), a technique requiring low computational complexity is preferred. Moreover, by labelling uniform regions where standard linear interpolation filters (such as bilinear and bicubic filters) perform satisfactorily, edge-adaptive interpolation need only be performed around high-frequency image details, resulting in reduced computational complexity on the receiver-side whilst nevertheless obtaining a substantial increase in visual quality.

In the above described example, the edge information is obtained by performing edge detection on pixels in the input image. Video coding standards such as H.264 and MPEG are based on block processing. In the case that block-type encoding is used, instead of performing edge detection on pixels, the dominant edge structure in individual blocks can be detected at the transmitter-side after the input image has been encoded. Then, at the receiver-side, the pixels within a block can be processed based on the edge label of the block, which is transmitted as the side information 14. As a further enhancement, for texture blocks and blocks with no dominant edge structure, the interpolation may be simple bilinear/bicubic or other non-edge-adaptive interpolation, which do not make any assumptions about the edge structure. This helps to avoid producing artefacts caused by faulty edge detection and/or classification.

In summary, embodiments enable high resolution images to be obtained by real-time interpolation at the receiver side using edge-adaptive interpolation techniques. At the same time, the computational complexity, and therefore the cost, required at the receiver-side is low because the edge information required for the interpolation is obtained at the transmitter side and transmitted separately as side information to the receiver-side. This makes real-time edge-adaptive interpolation at the receiver side practical at relatively low cost.

As mentioned above, there are a number of techniques other than interpolation or upscaling that benefit from being edge-adaptive, such as down-sampling (e.g. from a high definition image to a standard definition image), standards conversion for digital television receivers and wireless hand-held devices with video streaming capabilities, etc. The processing that is carried out at the receiver-side using separately transmitted edge information can be one or more of these types.

Embodiments of the invention have been described with particular reference to the examples illustrated. However, it will be appreciated that variations and modifications may be made to the examples described within the scope of the invention.

The invention claimed is:

1. A method of processing of a digital image, the method comprising:
   obtaining edge information of an input digital image;
   encoding input digital image data corresponding to the input digital image as blocks of pixels;
   transmitting the encoded digital image data corresponding to the input digital image to a receiver;
   transmitting the edge information to the receiver; and,
   obtaining an output digital image at the receiver by processing the digital image data received at the receiver using the edge information received at the receiver, wherein the obtaining of the edge information comprises:
   obtaining respective edge information for at least some of the blocks by detecting whether each individual block has a dominant edge structure; and
   assigning an edge label to said respective block based upon said detection; and
   said processing comprises:
   decoding the encoded input digital image data received at the receiver; and
   processing the pixels in said blocks respectively according to the edge labels of each of said blocks.

2. A method according to claim 1, wherein the encoding comprises compressing the input digital image data and the decoding comprises decompressing the compressed input digital image data.

3. A method according to claim 1, wherein the processing of the digital image data received at the receiver comprises scaling the input digital image so that the resolution of the output digital image is different from the resolution of the input digital image.

4. A method according to claim 3, wherein the scaling comprises interpolating the input digital image so that the resolution of the output digital image is higher than the resolution of the input digital image, the interpolating being edge-adaptive and using the edge information received at the receiver.

5. A method according to claim 3, wherein the scaling comprises down-sampling the input digital image so that the resolution of the output digital image is lower than the resolution of the input digital image, the down-sampling being edge-adaptive and using the edge information received at the receiver.

6. A method according to claim 1, wherein the processing comprises converting the digital image data received at the receiver from one standard format to another standard format using the edge information received at the receiver.

7. A system for processing of a digital image, the system comprising:
 a transmitter-side apparatus and a receiver-side apparatus;
 the transmitter-side apparatus being constructed and arranged to encode input digital image data corresponding to an input digital image as blocks of pixels, to obtain edge information for at least some of the blocks of said input digital image by detecting whether each individual block has a dominant edge structure and by assigning an edge label to each respective block based upon said detection, to transmit the encoded digital image data corresponding to the input digital image to the receiver-side apparatus, and to transmit the edge information to the receiver-side apparatus; and,
 the receiver-side apparatus being constructed and arranged to obtain an output digital image at the receiver-side apparatus by processing the digital image data received at the receiver-side apparatus using the edge information received at the receiver-side apparatus, said processing comprising decoding the encoded input digital image data received at the receiver and processing the pixels in said blocks respectively according to the edge labels of each of said blocks.

8. A system according to claim 7, wherein the encoder is constructed and arranged to compress the input digital image data and the decoder is constructed and arranged to decompress the compressed input digital image data.

9. A system according to claim 7, wherein the receiver-side apparatus is constructed and arranged such that the processing of the digital image data received at the receiver-side apparatus comprises scaling the input digital image so that the resolution of the output digital image is different from the resolution of the input digital image.

10. A system according to claim 9, wherein the receiver-side apparatus is constructed and arranged such that the scaling comprises interpolating the input digital image so that the resolution of the output digital image is higher than the resolution of the input digital image, the interpolating being edge-adaptive and using the edge information received at the receiver-side apparatus.

11. A system according to claim 9, wherein the receiver-side apparatus is constructed and arranged such that the scaling comprises down-sampling the input digital image so that the resolution of the output digital image is lower than the resolution of the input digital image, the down-sampling being edge-adaptive and using the edge information received at the receiver-side apparatus.

12. A system according to claim 7, wherein the receiver-side apparatus is constructed and arranged such that the processing comprises converting the digital image data received at the receiver-side apparatus from one standard format to another standard format using the edge information received at the receiver-side apparatus.

13. A method of processing of a digital image, the method comprising:
 encoding input digital image data corresponding to an input digital image as blocks of pixels;
 obtaining edge information for at least some of the blocks of said input digital image by detecting whether each individual block has a dominant edge structure and assigning an edge label to each respective block based upon said detection;
 transmitting the encoded digital image data corresponding to the input digital image to a receiver; and,
 transmitting the edge information to the receiver;
 whereby an output digital image can be obtained at the receiver by processing the digital image data received at the receiver using the edge information received at the receiver, wherein said processing comprises:
 decoding the encoded input digital image data received at the receiver; and
 processing the pixels in said blocks respectively according to the edge labels of each of said blocks.

14. A method according to claim 13, wherein the encoding comprises compressing the input digital image data.

15. Transmitter-side apparatus for processing of a digital image, the apparatus being constructed and arranged to encode input digital image data corresponding to an input digital image as blocks of pixels;
 to obtain edge information for at least some of the blocks of said input digital image by detecting whether each individual block has a dominant edge structure and by assigning an edge label to each respective block based upon said detection;
 to transmit the encoded digital image data corresponding to the input digital image to a receiver, and to transmit the edge information to the receiver;
 whereby an output digital image can be obtained at the receiver by processing the digital image data received at the receiver using the edge information received at the receiver, wherein the processing of the digital image data by the receiver comprises:
 decoding the encoded input digital image data received at the receiver; and
 processing the pixels in said blocks respectively according to the edge labels of each of said blocks.

16. Apparatus according to claim 15, wherein the encoded input digital image data is compressed input digital image data.

17. A method of processing of a digital image, the method comprising:
 receiving at a receiver edge information of an input digital image;
 receiving at the receiver encoded digital image data comprising blocks of pixels corresponding to the input digital image; and,
 obtaining an output digital image at the receiver by processing the digital image data received at the receiver using the edge information received at the receiver, wherein the edge information comprises an assigned edge label for at least some of the blocks, each edge label representing the dominant edge structure for each respective individual block; and said processing comprises:
 decoding the encoded input digital image data received at the receiver; and
 processing the pixels in said blocks respectively according to the edge labels of each of said blocks.

18. A method according to claim 17, wherein the encoded input digital image data is compressed input digital image data, the decoding comprising decompressing the compressed input digital image data.

19. A method according to claim 17, wherein the processing of the digital image data received at the receiver comprises scaling the input digital image so that the resolution of the output digital image is different from the resolution of the input digital image.

20. A method according to claim 19, wherein the scaling comprises interpolating the input digital image so that the resolution of the output digital image is higher than the resolution of the input digital image, the interpolating being edge-adaptive and using the edge information received at the receiver.

21. A method according to claim 19, wherein the scaling comprises down-sampling the input digital image so that the resolution of the output digital image is lower than the resolution of the input digital image, the down-sampling being edge-adaptive and using the edge information received at the receiver.

22. A method according to claim 17, wherein the processing comprises converting the digital image data received at the receiver from one standard format to another standard format using the edge information received at the receiver.

23. Receiver-side apparatus for processing of a digital image, the apparatus being constructed and arranged to receive transmitted edge information of an input digital image, to receive transmitted digital image data encoded as blocks of pixels corresponding to the input digital image, and to obtain an output digital image by processing the received digital image data using the edge information, the apparatus comprising a decoder constructed and arranged to decode the encoded input digital image data received at the receiver-side apparatus, wherein the edge information comprises an assigned edge label for at least some of the blocks, each edge label representing the dominant edge structure for each respective individual block, and said processing comprising processing the pixels in said blocks respectively according to the edge labels of each of said blocks.

24. Apparatus according to claim 23, wherein the decoder is constructed and arranged to decompress compressed input digital image data.

25. Apparatus according to claim 23, constructed and arranged such that the processing of the digital image data received at the receiver-side apparatus comprises scaling the input digital image so that the resolution of the output digital image is different from the resolution of the input digital image.

26. Apparatus according to claim 25, constructed and arranged such that the scaling comprises interpolating the input digital image so that the resolution of the output digital image is higher than the resolution of the input digital image, the interpolating being edge-adaptive and using the edge information received at the receiver-side apparatus.

27. Apparatus according to claim 25, constructed and arranged such that the scaling comprises down-sampling the input digital image so that the resolution of the output digital image is lower than the resolution of the input digital image, the down-sampling being edge-adaptive and using the edge information received at the receiver-side apparatus.

28. Apparatus according to claim 23, constructed and arranged such that the processing comprises converting the digital image data received at the receiver-side apparatus from one standard format to another standard format using the edge information received at the receiver-side apparatus.

* * * * *